V. A. FYNN.
STARTER AND IGNITION CONTROL.
APPLICATION FILED JUNE 1, 1914.
1,143,378.
Patented June 15, 1915.
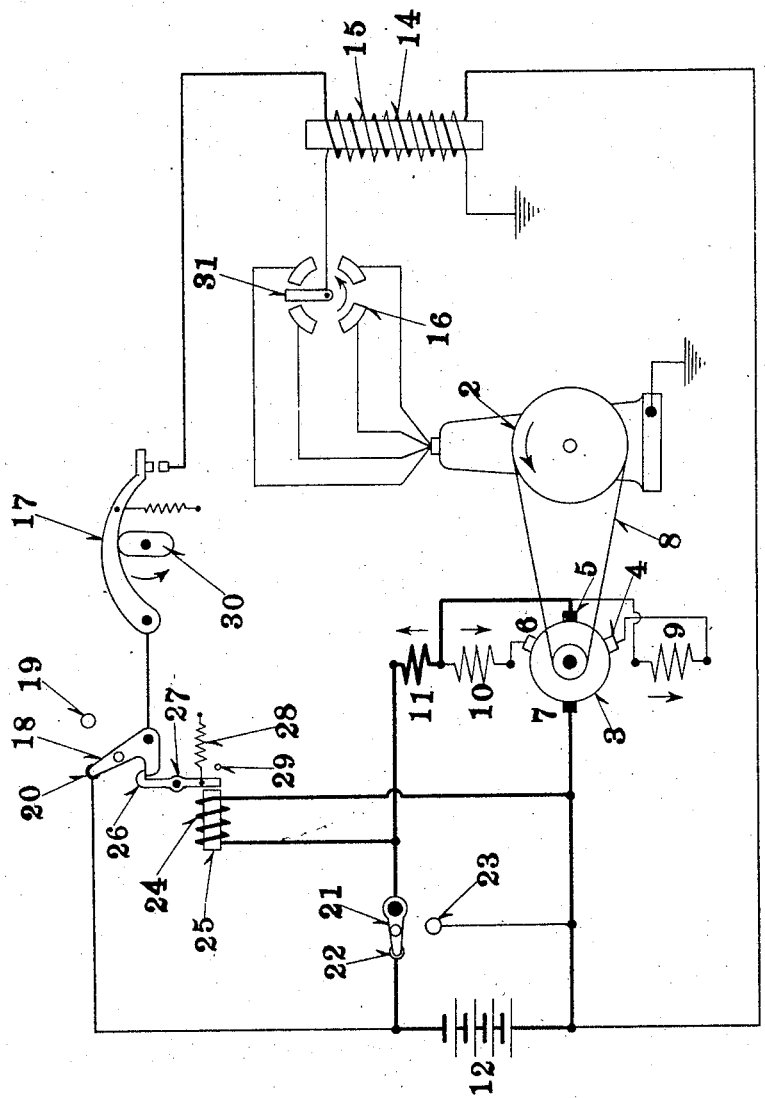
WITNESSES:
Charles A. Becker
J. W. Rhode
INVENTOR
V. A. Fynn,
BY
E. E. Huffman
ATTORNEY

UNITED STATES PATENT OFFICE.

VALÈRE A. FYNN, OF ST. LOUIS, MISSOURI, ASSIGNOR TO WAGNER ELECTRIC MANUFACTURING COMPANY, OF ST. LOUIS, MISSOURI, A CORPORATION OF MISSOURI.

STARTER AND IGNITION CONTROL.

1,143,378.    Specification of Letters Patent.    Patented June 15, 1915.

Application filed June 1, 1914. Serial No. 842,027.

*To all whom it may concern:*

Be it known that I, VALÈRE ALFRED FYNN, a subject of the King of England, residing at the city of St. Louis, State of Missouri, have invented a certain new and useful Starter and Ignition Control, of which the following is such a full, clear, and exact description as will enable any one skilled in the art to which it appertains to make and use the same, reference being had to the accompanying drawings, forming part of this specification.

This invention relates to the control of the ignition system applied to internal combustion engines operated in conjunction with an electric starter, and its main object is to so correlate the ignition and the starting circuits that the production of sparks in the cylinders cannot be interrupted by the operator as long as the starter is connected to the source from which it receives energy.

My invention is more particularly applicable to ignition systems and internal combustion engines as used on motor vehicles. It is now common practice, in connection with such vehicles, to provide a storage battery and a dynamo electric machine operated as a motor for the purpose of starting the engine, and as a dynamo for the purpose of charging the storage battery when the engine operates under its own power. In a system of this kind, it is very desirable to reduce the number of operations to be performed by the driver to the smallest possible number, and to so arrange the apparatus that, after the engine has been started by means of the dynamo electric machine, the connections between the latter and the storage battery need not be disturbed or altered until it is desired to bring the engine to rest. If this can be achieved, then the speed of the engine can be reduced to very much lower values without danger of stopping, for, even if ignition does not occur very regularly at said low speeds, the storage battery will always be operative to instantly supply the power required to keep the engine running.

In order to make it unnecessary to disturb the connection between the battery and dynamo when the engine is running at low speeds, I provide an interlocking device between the starter and ignition circuits and so arrange it that once the ignition circuit has been closed when the battery is connected to the dynamo electric machine, said circuit cannot be opened until the battery has been disconnected from the dynamo. By the use of this arrangement, the overloading and the draining of the battery when the engine is operating at low speeds will be avoided. Should it become necessary to disconnect the battery from the dynamo at very high engine speeds, then provision must be made for preventing the dynamo from exciting itself, for should this happen, a destructively high voltage would be generated. To meet this contingency, I so arrange my starting switch that the dynamo may be short-circuited thereby after the storage battery has been disconnected, but I also so design my dynamo electric machine as to keep its current output within the desired limits regardless of the speed of the engine, thereby making it generally unnecessary to disconnect the storage battery from the dynamo at very high speeds to avoid overcharging the battery.

My invention will be better understood by reference to the accompanying drawing, illustrating its application in connection with battery ignition.

The engine 2 is geared by means of the belt or chain 8 to the armature 3 of the dynamo electric machine. The main brushes 5, 7 coöperating with the armature 3 are located approximately in the neutral zone of the machine, a 2-pole embodiment of which is shown in the figure. Auxiliary brushes 4 and 6 are located on opposite sides of the main brush 5, and connected thereto through the shunt windings 9 and 10 respectively. The main brush 7 is directly connected to one pole of the storage battery 12 while the main brush 5 is connected to the other pole of the battery through the series winding 11 and the starting switch 21. An interlocking coil 24 adapted to energize the magnet 25 is connected to the terminals of the dynamo electric machine. The primary ignition circuit comprises the battery 12, the primary 14 of the spark coil, the circuit breaker 17 actuated by the cam 30 which is operated from the engine shaft, and a manually operated switch 18. This switch 18 is adapted to be locked in its closed position by means of a trigger 26 pivoted at 27 and normally held out of engagement with the switch 18 by means of the spring 28, which holds said trigger against the stop 29. When the core 25 is excited by the interlocking coil 24, the spring 28 is overpowered and the trigger brought into the position shown in the figure, in which it is capable of holding the switch 18 in its closed position as soon as the latter is so placed. The secondary ignition circuit comprises the secondary coil 15, one end of which is "grounded", while the other is connected to the blade 31 of the distributer 16, said blade being operated from the engine shaft in the usual way. The contact plates of the distributer are connected to the various spark plugs of the engine.
When the engine is at rest, the starting switch 21 should either be open or stand on point 23, in which latter case the dynamo electric machine will be short-circuited. The ignition switch 18 should then stand on off point 19 and can be placed on said point at any time, for the trigger 26 will be under the control of the spring 28 and, therefore, out of the way of the projection of the switch 18, which is adapted to coöperate with said trigger. When it is desired to start the engine, switch 21 should be placed on point 22, and the ignition switch should be closed by placing it on point 20. When the switch 21 is placed on contact 22, the magnet 25 will immediately take control of the trigger 26 and hold it in a position in which, when switch 18 is once closed, it will be held in closed position as long as switch 21 remains on 22. When switch 21 is closed, current from the battery will pass through the series winding 11 in a direction opposed to that of the arrow placed alongside said winding, and return to the battery mainly through the main brushes 5, 7, developing a powerful torque due to the interaction of the field produced by the winding 11 and the armature ampere-turns. As soon as the engine operates under its own power, and as it increases its speed, the current delivered by the battery to the dynamo acting as a motor, will diminish, become zero, and, finally, reverse, the dynamo then acting as generator and charging the battery. The rate of charge is kept within the prescribed limits by the arrangement of auxiliary brushes and shunt windings shown, and, also, by the fact that the generating current when passing through the series winding 11 does so in the direction indicated by the arrow, and opposes the magnetization produced by the shunt windings, thus also contributing to the safeguarding of the storage battery.

It will be seen from the foregoing description that it is quite impossible for the operator to interrupt the ignition circuit by means when the engine is running of the switch 18 without opening the starting switch 21 and short-circuiting the dynamo by placing this switch on 23, for, as long as switch 21 is on 22 or in open position, the interlocking coil 24 will remain energized and hold the trigger 26 in its locking position. At the same time, this arrangement does not prevent the operator from turning the engine over by means of the electric starter, without closing the ignition switch, nor does it prevent him from closing said switch at any time after switch 21 has been closed. Should it be desired for any reason to disconnect the dynamo from the battery while the engine is running, then the switch 21 should be placed on point 23, thereby short-circuiting the dynamo and preventing same from generating any voltage. It is, in fact, best not to provide an "off" position for the switch 21.

Having fully described my invention, what I claim as new and desire to secure by Letters-Patent of the United States is:

1. In apparatus of the class described, the combination of a combustion engine, an ignition circuit, a battery, a dynamo electric machine for starting the engine, means for connecting the dynamo electric machine to the battery, a switch controlling the ignition circuit, and electromagnetically operated means for preventing the removal of said switch from its position in which the ignition circuit is operative while the battery is connected to the dynamo electric machine.

2. In apparatus of the class described, the combination of a combustion engine, an ignition circuit, a battery, a dynamo electric machine for starting the engine, a switch in the ignition circuit, means for connecting the battery to the dynamo electric machine, and means controlled by the battery for preventing the opening of the ignition switch when the battery is connected to the dynamo electric machine.

3. In apparatus of the class described, the combination of a combustion engine, an ignition circuit, a battery, a dynamo electric machine for starting the engine, a switch in the ignition circuit, a trigger adapted to lock said switch in a selected position, and an electromagnet controlling said trigger.

4. In apparatus of the class described, the combination of a combustion engine, an ignition circuit, a battery, a dynamo electric machine for starting the engine, a switch in the ignition circuit, a trigger adapted to lock said switch in a selected position, and an electromagnet controlling said trigger, said magnet being connected to the terminals of the dynamo electric machine.

5. In apparatus of the class described, the combination of a combustion engine, an ignition circuit, a dynamo electric machine for starting the engine, a supply circuit for said machine, a switch controlling the ignition circuit, and means controlled from the supply circuit of the dynamo electric machine for preventing removal of the ignition controlling switch from a selected position.

6. In apparatus of the class described, the combination of a combustion engine, an ignition circuit, a dynamo electric machine for starting the engine, a battery for supplying current to the dynamo electric machine, a switch controlling the ignition circuit, means for preventing the removal of the ignition switch from a selected position while the battery is connected to the dynamo electric machine, and means for short-circuting the dynamo electric machine.

In testimony whereof, I have hereunto set my hand and affixed my seal in the presence of the two subscribing witnesses.

VALÈRE A. FYNN. [L. S.]

Witnesses:
W. A. ALEXANDER,
G. M. SHORE.